US009385885B2

(12) United States Patent
Kulkarni et al.

(10) Patent No.: US 9,385,885 B2
(45) Date of Patent: Jul. 5, 2016

(54) NETWORK NODE FOR A COMMUNICATION NETWORK HAVING A FIRST SUBNETWORK USING A SPANNING TREE PROTOCOL AND A SECOND SUBNETWORK CONNECTED TO THE FIRST SUBNETWORK

(75) Inventors: Vivek Kulkarni, Unterhaching (DE);
Joachim Lohmeyer, Hilpoltstein (DE);
Matthias Scheffel, Unterhaching (DE);
Andreas Zirkler, Höhenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 419 days.

(21) Appl. No.: 12/986,786

(22) Filed: Jan. 7, 2011

(65) Prior Publication Data

US 2012/0008530 A1  Jan. 12, 2012

(30) Foreign Application Priority Data

Jan. 8, 2010  (EP) ..................................... 10000124

(51) Int. Cl.
*H04L 12/42* (2006.01)
*H04L 12/46* (2006.01)
*H04L 12/753* (2013.01)
*H04L 12/781* (2013.01)

(52) U.S. Cl.
CPC .............. *H04L 12/462* (2013.01); *H04L 12/42* (2013.01); *H04L 45/48* (2013.01); *H04L 45/52* (2013.01)

(58) Field of Classification Search
None
See application file for complete search history.

(56) References Cited

U.S. PATENT DOCUMENTS 6,304,575 B1 * 10/2001 Carroll et al. ................. 370/408
7,463,597 B1 * 12/2008 Kompella ..................... 370/256
7,558,195 B1 *  7/2009 Kuo et al. ..................... 370/219

(Continued)

FOREIGN PATENT DOCUMENTS

| CN | 101335646 | 12/2008 |
|---|---|---|
| CN | 101399773 | 4/2009 |
| WO | WO 2008/119626 | 10/2008 |
| WO | WO 2008/119649 | 10/2008 |

OTHER PUBLICATIONS

The Institute of Electrical and electronics Engineers, Inc.; IEEE Standards for Local and Metropolitan Area Networks; Virtual Bridged Local Area Networks-Amendment 3: Multiple Spanning Trees; IEEE Std 802.1s-2002; ISBN: 978-0-7381-3495-6; p. 111-121.; Others; 2002; US.

Cisco Systems et al: Understanding Multiple spanning Treee Protocol (802.1s) Internet Citation; May 14, 2005; XP002426379: URL: http://web.archive.org/web/20050514065955/www.cisco.com/warp/public/4 73147.pdf; Others; 2005.

(Continued)

Primary Examiner — Timothy J Weidner
(74) Attorney, Agent, or Firm — Cozen O'Connor (57) ABSTRACT

A network node for a communication network comprising a first subnetwork and a second subnetwork connected to the first subnetwork, wherein the first subnetwork uses a spanning tree protocol and the second subnetwork uses a second protocol differing from the protocol of the first subnetwork, and the network node is configured as an element for the second subnetwork and is configured for communication within the second subnetwork. In addition, the network node configured by a spanning tree functionality as a spanning tree master node for checking and controlling the second subnetwork in such a way that the second subnetwork is handled or is able to be handled by the spanning tree protocol of the first subnetwork as a virtual network node.

9 Claims, 2 Drawing Sheets

(56) References Cited

U.S. PATENT DOCUMENTS

| | | | |
|---|---|---|---|
| 7,864,712 B2* | 1/2011 | Khan et al. | 370/256 |
| 7,936,702 B2* | 5/2011 | Kessler et al. | 370/256 |
| 8,355,348 B1* | 1/2013 | Miller et al. | 370/256 |
| 2007/0159983 A1* | 7/2007 | Eglin et al. | 370/254 |
| 2008/0259788 A1* | 10/2008 | Wang et al. | 370/221 |
| 2009/0168671 A1* | 7/2009 | Holness et al. | 370/256 |
| 2009/0175204 A1* | 7/2009 | Kim | 370/256 |
| 2010/0110884 A1* | 5/2010 | Kulkarni et al. | 370/228 |
| 2011/0134802 A1* | 6/2011 | Rajagopalan et al. | 370/256 |
| 2011/0317555 A1* | 12/2011 | Kleineberg et al. | 370/230 |

OTHER PUBLICATIONS

Kleinberg et al: Automatic device configuration for Ethernet ring redundancy protocols; Emerging Technologies&Factory Automation, 2009. ETFA 2009. IEEE, Piscataway NJ, USA, Sep. 22, 2009), p. 1-8; XP031575608; ISBN: 978-1-4244-2727-7, pp. 5-6.; Others; 2009.

* cited by examiner

NETWORK NODE FOR A COMMUNICATION NETWORK HAVING A FIRST SUBNETWORK USING A SPANNING TREE PROTOCOL AND A SECOND SUBNETWORK CONNECTED TO THE FIRST SUBNETWORK

BACKGROUND OF THE INVENTION

1. Field of the Invention

The present invention relates to a network node for a communication network, where the communication network comprises a first subnetwork and a second subnetwork connected to the first subnetwork, in which the first subnetwork uses a spanning tree protocol and the second subnetwork uses a second protocol that differs from the protocol of the first subnetwork, with the network node being configured as an element of the second subnetwork and being configured to communicate within the second subnetwork.

2. Description of the Related Art

Publication WO 2008/119626 A2, for example, discloses network nodes for an industrial LAN (Local Area Network) which is designed as a ring. This industrial LAN is connected to an office LAN which is designed as a complex, meshed network and on which what is referred to as a Radio Spanning Tree Protocol (RSTP) in accordance with IEEE Standard 802.1w is installed. With the aid of this RSTP protocol, despite many redundant paths in an office Local Area Network (LAN), communication loops within this network can be successfully avoided. Using this protocol, the corresponding communication paths can be adapted even after faults, such as the failure of lines, ports and/or network nodes.

Problems arise in the prior art during the linkage of such an office LAN, which uses the RSTP protocol, and an industrial LAN on which for example, an industry-compatible realtime-capable protocol is installed, if such a reconfiguration by the RSTP protocol occurs. In such cases, this can lead to problems in the interworking of the RSTP protocol and the protocol in the industrial LAN which, for example, can delay communication in the industrial LAN or even interrupt the communication.

SUMMARY OF THE INVENTION

It is therefore an object of the present invention to improve the communication and/or reconfiguration within a communication network comprising different subnetworks, which comprises an office LAN and an industrial LAN, for example.

This and other objects and advantages are achieved by a network node for a communication network in which the communication network comprises a first subnetwork and a second subnetwork connected to the first subnetwork, the first subnetwork uses a spanning tree protocol and the second subnetwork uses a protocol that differs from the protocol of the first subnetwork, and in which the network node is configured as an element for the second subnetwork and is configured for communication within the second subnetwork, with the network node being further being configured by a spanning tree functionality as a spanning tree master node for checking and controlling the second subnetwork, such that the second subnetwork is handled or is able to be handled by the spanning tree protocol of the first subnetwork as a virtual network node.

Due to handling the second subnetwork as a virtual network node for the spanning tree protocol of the first subnetwork, communication in the first subnetwork is influenced less or even not at all by the communication within the second subnetwork since the second subnetwork is seen as a single node for the first subnetwork. The interactions between the protocols of the first and second subnetwork are controlled and managed by the spanning tree functionality of the spanning tree master node in the second subnetwork such that the mutual disturbances of the different protocols in the two subnetworks are reduced. The reconfiguration in the first subnetwork is also facilitated in this way, because the structure of the second subnetwork has no role or a lesser role to play for the first subnetwork.

Here, the communication network can be a wired communication network and also a network communicating over an air interface, but can also be a combination of wired and wireless network. Furthermore, the communication network or also parts the communication network can be embodied in accordance with Ethernet, Profinet, Profibus, WLAN or similar standards. The communication network or parts thereof can also involve a Local Area Network (LAN), a Wide Area Network (WAN), a Wireless Local Area Network (WLAN) or similar, or combinations thereof.

The first subnetwork can be connected to the second subnetwork through one or more network connections.

Furthermore, the second subnetwork can be different from the first subnetwork, which means that for example each network node of the communication network uniquely belongs to one of the two subnetworks.

Within the context of the present description, a spanning tree protocol generally corresponds to a network protocol for a communication network with which transport loops or meshes in the communication paths in the communication network can be reduced or avoided. Furthermore, a spanning tree protocol within the meaning of the present description can also be a protocol for avoiding redundant transport paths in the communication network.

Furthermore, a spanning tree protocol within the meaning of the present description can also be a network protocol for management of redundant transport paths in the event of transport errors (e.g., an interruption of a line or a failure of a network node) in the communication network. A spanning tree protocol can also be described as a combination of a number of the above definitions.

Typical examples of a spanning tree protocol are a Spanning Tree Protocol (STP), as defined in IEEE Standard 802.1d for example, a "Rapid Spanning Tree Protocol" (RSTP), as defined in IEEE Standard 802.1w for example, or also a "Multiple Spanning Tree Protocol" (MSTP), as is defined in IEEE Standard 802.1s for example. All developments of these protocols or all compatible protocols are likewise examples of spanning tree protocols within the meaning of the present application.

The fact that a specific protocol is used in a specific communication network or subnetwork does not mean that other further protocols cannot be implemented in the network nodes of the respective networks and/or also used by the network nodes and in the respective networks. Thus, for example, the second protocol and at the same time also the spanning tree protocol or parts thereof can be implemented on a node of the second subnetwork. Protocol messages in accordance with the spanning tree protocol can also be sent, received and/or forwarded, in the second subnetwork, for example. In particular, the spanning tree master node and/or the spanning tree auxiliary nodes or spanning tree reserve master nodes explained in greater detail below can, for example, be configured in this way.

The second protocol of the second subnetwork differs from the spanning tree protocol of the first subnetwork. Here, the second protocol can, for example, have a shorter typical reconfiguration time for changes in the network than the first subnetwork. With a network node designed in this way for the second subnetwork, the invention has the further advantage that despite a comparatively long reconfiguration time in the first subnetwork, the relatively short reconfiguration time in the second subnetwork can be retained by the spanning tree protocol.

Furthermore, the first and the second subnetwork can, for example, use a realtime-capable or also a non-realtime-capable protocol.

In an advantageous embodiment of the invention, a realtime-capable protocol is used in the second subnetwork as the second protocol. Furthermore, the spanning tree protocol of the first subnetwork can be non-realtime-capable in this case. In this case of a realtime-capable second subnetwork, the invention offers the advantage that the realtime capabilities of the second protocol are not affected or are affected relatively little by a reconfiguration in the spanning tree protocol. A reason for this is that the management of the spanning tree protocol in the second subnetwork can be taken over to a relatively large extent by the spanning tree master node and in this way other elements of the second subnetwork are relieved of the strain of undertaking such tasks. Thus, most elements of the second subnetwork are not involved or only involved in and affected by this reconfiguration to a small extent.

Within the present description an element suitable for switching and/or forwarding data in the communication network is referred to as a network node. Examples of network nodes can be so-called bridges and/or so-called switches and/or other comparable network nodes suitable for switching information in the communication network. Typically, a communication network or also a subnetwork consists of at least two network nodes linked at least partly to one another.

In a further embodiment of the invention, provision is made for the second subnetwork to be handled or to be able to be handled by the spanning tree protocol of the first subnetwork as precisely one virtual network node. This case results in especially simple handling of the second subnetwork by the spanning tree protocol of the first subnetwork.

In the present invention, the abbreviation STP is to be understood as representing a Spanning Tree Protocol in accordance with IEEE Standard 802.1d or a comparable standard. The abbreviation RSTP is to be understood as a Rapid Spanning Tree Protocol in accordance with IEEE Standard 802.1w or a comparable standard and the abbreviation MSTP as a "Multiple Spanning Tree Protocol" in accordance with IEEE Standard 802.1s or a comparable standard.

In a preferred embodiment, the spanning tree protocol can for example be embodied as an STP protocol and the spanning tree functionality can include an STP functionality. Here, the STP functionality includes corresponding functional units for executing the STP protocol. Furthermore, the spanning tree protocol can also be embodied as an RSTP protocol, with the spanning tree functionality then being able to include an RSTP functionality. The RSTP functionality in this case includes the functionality for executing functional steps which are instigated by the RSTP protocol in the network node. Furthermore, the spanning tree protocol can also be embodied as an MSTP protocol and the spanning tree functionality can include an MSTP functionality. The MSTP functionality in such cases also includes the functionality for implementing requirements of the MSTP protocol in network nodes.

Furthermore spanning tree protocol and spanning tree functionality can also include a combination of the aforementioned protocols.

This embodiment of the present invention makes it possible that for example an STP, RSTP and/or MSTP network can be coupled to a further network, such as a realtime-capable network, without the complex network control and reconfiguration precautions in the STP, RSTP and/or MSTP networks affecting the operation of the appended second subnetwork too much or even at all.

It is also possible to provide for the second subnetwork to have a linear structure and/or a ring structure. Here, a linear structure typically corresponds to a structure in which the network nodes of the second subnetwork are logically linked to form a linear chain. A ring structure can, for example, be a structure of a second subnetwork in which the network nodes of the second subnetwork are logically linked to form a ring. In such linear or ring networks, particularly rapid reconfiguration times can be achieved or realtime protocols can also be especially well implemented. In this embodiment, an inventive network node offers the advantage of the spanning tree protocol of the first network having less of an adverse effect or no adverse effect at all on the second "fast" network.

The second subnetwork can, for example, use a realtime-capable protocol. Furthermore, the second subnetwork can use a Hyper Ring, a Hierarchially Segmented Routing (HSR), a Turbo Ring, an Resilient Ethernet Protocol (REP) and/or a Multiple Registration (MRP) protocol. In such cases, the protocols are examples of industry-compatible communication protocols which also allow within the framework of industrial tasks, such as industrial control and regulation tasks, relatively short reconfiguration times with a high level of network security and/or stability.

Within the framework of the present description a realtime-capable communication protocol or a realtime-capable protocol is to be understood as a protocol within which a defined reaction time to specific events in the communication network is ensured. Such realtime-capable protocols can, for example, be embodied in accordance with an industrial Ethernet standard, a Profinet standard and/or a Profibus standard.

The second subnetwork can have at least one external interface, with external interfaces of the second subnetwork being those interfaces of network nodes of the second subnetwork which are not connected to a network node of the second subnetwork. Typically, such external interfaces can, for example, be linked or be able to be linked with the first subnetwork and/or with further communication networks and/or also to communication terminals (e.g., computers, control devices, modems, telephones, sensors or actors).

The spanning tree functionality of the spanning tree master node can typically include the detection of external interfaces of the second subnetwork. This functionality can, for example, include the capability of sending a request message to network nodes of the second subnetwork, with the request to the respective network node to return an information message through the external interfaces of the respective network node to the spanning tree master node. Furthermore, this functionality can include the capability of receiving or converting information messages from individual network nodes of the second subnetwork through external interfaces present at these network nodes.

Furthermore, the spanning tree functionality of the spanning tree master node can include functionality for issuing interface identification data (e.g., port IDs), especially unique interface information data, for external interfaces of the second subnetwork. In this way, the spanning tree master node can, for example, assign each external interface in the second subnetwork a unique identification number or unique identification information, so that each external interface in the second subnetwork is able to be uniquely identified.

The spanning tree functionality of the spanning tree master node can also include the transfer of interface identification data to the network node or nodes of the second subnetwork. In this way the spanning tree master node can inform the other network node or nodes of the second subnetwork about the identification data or interface IDs of their external interfaces.

Furthermore, the spanning tree functionality of the spanning tree master node can also include the computation of interface states of external interfaces of the second subnetwork. Such interface states, e.g., port states, can for example be that the corresponding interface (e.g., the corresponding external port) is blocked for information forwarding, is open for information forwarding and is forwarding corresponding incoming messages, that the corresponding interface is only receiving messages without forwarding these, or can be similar comparable states. For example, interface states can be the states "Disabled", "Blocking", "Listening", "Learning", "Forwarding", "Discarding", in accordance with the STP or RSTP Standard.

Typically, in spanning tree protocol networks, such interface states can be computed by each network node for the respective own interfaces. This means a relatively high outlay within each network node, if changes arise in the spanning tree network (e.g., by a network reconfiguration, new network nodes or corresponding line outages or faults). The presently contemplated embodiment of the invention typically has the advantage over the aforementioned prior art embodiment in that this computation of interface states can be undertaken within the spanning tree master node in the second subnetwork for a number or for all external interfaces of the second subnetwork and thus relieve the other network nodes of the second subnetwork of the activity associated with the spanning tree protocol of the first subnetwork.

In this connection, the spanning tree functionality of the spanning tree master node can also include the capability of transmitting interface states, such as interface states computed by the spanning tree master node, to other network nodes of the second subnetwork. In this way, the respective network nodes can implement the corresponding defined or established interface states for their corresponding interfaces.

The spanning tree functionality of the spanning tree master node can also include receipt of a protocol data message assigned to the spanning tree protocol. These messages can, for example, come from a further network node of the second subnetwork and/or trigger the determination of the reaction to the or to a received protocol data message and/or trigger the transfer of a response protocol data message in reaction to the or to a received protocol data message, e.g., to the further network nodes of the second subnetwork.

Such protocol data messages can be messages within the framework of the spanning tree protocol with which the underlying communication network is organized. For example such protocol data messages can be information about a central network node of the corresponding network (e.g., a root bridge or a similar network node) or also corresponding request messages to request information from individual network nodes. Such protocol data messages can, for example, be the Bridge Protocol Data Units (i.e., Bridge PDUs) defined for an STP, RSTP and/or MSTP protocol. In this way, the spanning tree master node can, for example, receive a protocol data message arriving at a further network node of the second subnetwork from the network node as well.

Furthermore, the spanning tree master node can determine a possible reaction of the original receiving network node in response to such a protocol data message and then forward this reaction to this network node. In this case, such a reaction can typically be the instruction to this further network node of the second subnetwork to transmit a specific further protocol data message or also to transfer this message directly to the further network node and to instruct the further network to forward the data message to a corresponding user or a corresponding network. This also produces the advantage that the spanning tree master node can relieve the further nodes of the second subnetwork or the other network nodes of the second subnetwork of tasks involved with the spanning tree protocol of the first subnetwork linked to the second subnetwork. This means that communication within the second subnetwork is less adversely affected or not adversely affected by the spanning tree protocol of the first subnetwork.

The spanning tree functionality of the spanning tree master node can also include the functionality that the spanning tree master node functions as a central node for the first subnetwork such that the second subnetwork is handled or is able to be handled by the spanning tree functionality of the spanning tree master node by the spanning tree protocol of the first subnetwork as central node for the first subnetwork. A network node is regarded as the central node within the context of a spanning tree protocol as a node which controls the central configuration and control of the communication network concerned with the spanning tree protocol in relation to the spanning tree protocol. An example of such a central node within the framework of an STP, RSTP, and/or MSTP network is the root bridge which is defined within the framework of the corresponding protocols. In this way, for example, the entire second subnetwork of the first subnetwork can typically function as a central node for the communication network involved with the spanning tree protocol.

The object of the invention is also achieved by a network node for a communication network comprising a first subnetwork and a second subnetwork connected to the first subnetwork, in which the first subnetwork uses a spanning tree protocol and the second subnetwork uses a second protocol differing from the spanning tree protocol of the first subnetwork, and the network node is configured as an element for the second subnetwork and is configured for communication within the second subnetwork, with the second subnetwork further comprising a spanning tree master node in accordance with the present description and with the network node being embodied and configured as a spanning tree reserve master node, which has the features of a spanning tree master node in accordance with the present description.

In addition, the spanning tree reserve master node is further embodied and configured such that the spanning tree functionality of the spanning tree reserve master node is deactivated in a normal state, with the spanning tree master node assuming its spanning tree functionality in the normal state, and with the spanning tree functionality of the spanning tree reserve master node being activated in an error state, with the spanning tree master node exhibiting a malfunction in the error state.

In this case, the communication network, the first subnetwork, the second subnetwork, the spanning tree protocol, the second protocol of the second subnetwork and also the embodiments of the spanning tree master node and the spanning tree functionality can be configured and embodied in accordance with the present description.

In the normal state, the spanning tree master node can, for example, be fully operable or also operable in a manner sufficient for its main communication function.

In the error state, the spanning tree master node in the second subnetwork can, for example, typically no longer completely fulfill its communication tasks. A malfunction of the spanning tree master node can, for example, be a node outage, a fault in the spanning tree functionality of the node and/or other internal errors, interface errors or also other hardware errors as well as switching off or a power outage.

The deactivation of the spanning tree functionality in the normal state can typically indicate that the spanning tree functionality of the spanning tree reserve master node assigned to a spanning tree master node is not active in the spanning tree reserve master node in the normal state. This can typically indicate that the spanning tree reserve node in the normal state is not acting as the spanning tree master node and recognizable within the communication.

The activation of the spanning tree functionality in the spanning tree reserve master node indicates that at least one, preferably several, further preferably all functionalities of the spanning tree functionality of the spanning tree master node are active in the spanning tree reserve master node.

The presently contemplated embodiment has the advantage that the management of the communication network consisting of at least the first and the second subnetwork is further simplified, in that even with an outage of a spanning tree master node which takes over coordination of the second subnetwork within the spanning tree protocol of the first subnetwork, or also for a malfunction or an outage respectively of the spanning tree master node, the functionality of the second subnetwork continues to be guaranteed as a virtual node for the spanning tree protocol. This enables the functionality of the second subnetwork and also its integration into the spanning tree protocol of the first subnetwork to continue to be maintained, for example, even if the spanning tree master node in the second subnetwork exhibits a malfunction. For example, reconfiguration times in the second subnetwork or also a realtime capability therein will also not be adversely affected or not significantly adversely affected by such a malfunction.

The activation of the spanning tree functionality of the spanning tree reserve master node can, for example, be undertaken automatically, e.g., by the spanning tree reserve master node not receiving any messages and/or signals from the spanning tree master node over a specific period of time and thus having to assume that the latter is malfunctioning. Furthermore, the activation can also typically be undertaken by a message, e.g., from the spanning tree master node itself or also from another network node in the second subnetwork. Such a case can typically occur with an intentional switching off of the spanning tree master node or with comparable events. Such an activation message can, for example, also be part of an error protocol within the spanning tree master node which can run during a self-detection of a malfunction in the spanning tree master node.

Furthermore, in the event of there being both a spanning tree master node and a spanning tree reserve master node in the second subnetwork, to exercise the spanning tree functionality of the spanning tree reserve master node, the spanning tree master node can send the required information or be embodied for transferring this information to the node. Furthermore, to transfer this information to the spanning tree reserve master node, it can be embodied in accordance with a predetermined rule or predeterminable rules or can transfer such information in accordance with a predetermined rule or predeterminable rule.

Such required information can typically be information of the spanning tree master node which the spanning tree reserve master node requires if it has to take over the functionality of the spanning tree master node on occurrence of an error. In such cases identification data of the spanning tree master node can typically involve information about the external interfaces, their identification data, the interface states of external and/or internal interfaces and further comparable information.

The transfer of such information in accordance with a predetermined or predeterminable rule can, for example, be a transfer at regular intervals. Furthermore, such a predeterminable rule can include the transfer of such information at the request of the spanning tree reserve master node. Furthermore, the rule can also include the spanning tree master node then transferring required information to the spanning tree reserve master node if a change has been made to this information.

In this way, the spanning tree reserve master node is always equipped with the required information to be able to take over the spanning tree functionality of the spanning tree master node in the event of an error.

The aforementioned object is further achieved by a network node for a communication network with the communication network comprising a first subnetwork and a second subnetwork linked to the first subnetwork, where the first subnetwork uses a spanning tree protocol and the second subnetwork uses a second protocol that is different from the spanning tree protocol of the first subnetwork, and the network node is configured as an element for the second subnetwork and is configured for communication within the second subnetwork.

Moreover, the second subnetwork further comprises a spanning tree master node in accordance with the present description, where the network node is embodied and configured as a spanning tree auxiliary node, so that it exhibits a spanning tree support functionality for supporting the spanning tree functionality of the spanning tree master node.

The spanning tree support functionality thus permits the spanning tree auxiliary node to support the spanning tree functionality of the spanning tree master node.

In this way, it is possible to simplify the management of the communication network, since with the spanning tree auxiliary node in conjunction with a spanning tree master node, the second subnetwork can act within the spanning tree protocol of the first subnetwork as a quasi-autonomous subsystem. In such cases, the spanning tree auxiliary node can support the spanning tree functionality of the spanning tree master node such that in this interaction the second subnetwork is handled or is able to be handled by the spanning tree protocol of the first subnetwork as a, i.e., a single, virtual network node. In such cases, the spanning tree master node can then typically take over the central management function of the spanning tree protocol within the second subnetwork and the spanning tree auxiliary node or nodes can support the spanning tree master node such that they supply the master node with corresponding information or forward or process corresponding information coming from the master node.

For example, the spanning tree reserve master node can also be embodied and configured in accordance with the present description so that in the normal state it exercises or can exercise the function of a spanning tree auxiliary node as explained in the present description.

The spanning tree support functionality can, for example, include an STP functionality to support an STP protocol. Furthermore the spanning tree support functionality can also include an RSTP functionality to support an RSTP protocol. The spanning tree support functionality can also include an MSTP functionality to support an MSTP protocol. With such an embodiment, the coupling of the second subnetwork to a first subnetwork with an STP, RSTP and/or MSTP protocol is simplified.

The communication network, the first subnetwork, the second subnetwork, the spanning tree protocol, the network nodes, the spanning tree master node as well as the spanning tree functionality can continue to be embodied and configured in accordance with the present description.

In addition the spanning tree network node can have one or more external interfaces which are not connected or able to be connected to a network node of the second subnetwork. In such cases, as explained in greater detail in the present description, the external interfaces can be embodied and configured, for example, as described herein.

Generally, within the context of the present description the term "external interface" is to be understood as an interface of a network node which in the disclosed embodiments of the network is not connected to the second subnetwork. The interface must only have the corresponding properties needed for this purpose. The fact that an interface also provides the opportunity of alternately also being connected to a network node of the second subnetwork, does not change the situation.

The spanning tree support functionality of the spanning tree network node can typically include the functionality for transferring interface information of the external interfaces of the spanning tree auxiliary node to the spanning tree master node. In such cases, the interface information can, for example, be embodied or configured in accordance with the present description. In such cases, the trigger for sending such interface information can typically be a request from the spanning tree master node. Furthermore, the spanning tree auxiliary node can also send such interface information on its own initiative, such as at regular intervals or if the corresponding interface information changes or has changed. In this way, the spanning tree auxiliary node can support the spanning tree functionality of the master node, because this type of information helps the master node to represent and to manage the second subnetwork as a virtual network node within the framework of the spanning tree protocol of the first subnetwork.

Furthermore, the spanning tree support functionality of the spanning tree auxiliary node can include the functionality for communication with an external network node connected through the external interface of the spanning tree auxiliary node or an external communication terminal, connected thereto. Here, a communication terminal can be any transmitter and/or receive information over the communication network and can be configured in accordance with the present description. Furthermore, network nodes can also be designed in accordance with the present description. Advantageously, the spanning tree support functionality of the spanning tree auxiliary node also includes the functionality for transmitting data coming from the first subnetwork over one of its external interfaces and also the transmission of such data to a receiver in the first subnetwork.

In addition, the spanning tree support functionality of the spanning tree auxiliary node can include the functionality for receiving and processing interface identification data transferred from the spanning tree master node relating to an interface, especially an external interface, of the spanning tree auxiliary node. In such cases, the interface identification data as well as the spanning tree master node can once again be embodied in accordance with the present description. In this way, the spanning tree auxiliary node can implement the configuration of the second subnetwork in relation to the spanning tree protocol of the first subnetwork determined by the spanning tree master node.

The spanning tree support functionality of the spanning tree auxiliary node can also include the functionality for receiving and for processing interface status messages from the spanning tree master node in relation to an interface, i.e., an external interface, of the spanning tree auxiliary node. In such cases, the interface status messages as well as the spanning tree master node can once again be embodied in accordance with the present description. The present embodiment also allows the implementation of the configuration of the second subnetwork in relation to the spanning tree protocol determined by the spanning tree master node.

Furthermore, the spanning tree support functionality can also include the transfer of a protocol data message received over the first interface of the spanning tree auxiliary node, assigned to the spanning tree protocol and/or the receipt and processing of a protocol data message or a response protocol data message of the spanning tree master node, i.e., as a reaction to a sent protocol data message. In this case, the protocol data message as well as the response protocol data message can be embodied and configured in accordance with the present description. Such protocol data messages can typically be predetermined for network management of a communication network controlled by the spanning tree protocol. By implementing such protocol data messages, and the corresponding response protocol data messages the communication paths can be determined, for example, and possible transport loops determined as well as the adaptation of interfaces of the individual network nodes typically for avoiding such transport loops. A spanning tree auxiliary node can then, for example, forward a protocol data message received over an external interface to the spanning tree master node so that the latter can further process this message. Furthermore, the spanning tree auxiliary node can be given the task by the spanning tree master node of sending over a specific external interface a specific protocol data message or response protocol data message or of forwarding a corresponding message transferred by the spanning tree master node.

In an alternative embodiment, the spanning tree auxiliary node implements information in relation to a state to be set at one of its interfaces, i.e., one of its external interfaces. In this way, the interface states which can, for example, be embodied in accordance with the present description, are implemented in the spanning tree auxiliary node.

This presently contemplated embodiment of the invention makes possible a further improved network management of the communication network, because the entire or a significant part of the complexity which is created in the second subnetwork by the spanning tree protocol of the first subnetwork connected to the second subnetwork can be encompassed in the spanning tree master node and the other loads need only have a corresponding, generally markedly less complex support functionality. Consequently, the negative properties of the spanning tree protocol are reduced to the positive properties of the second subnetwork, such as fast reconfiguration time or realtime capability.

The present object is likewise achieved by a communication subnetwork, comprising at least two network nodes and at least one interface for connecting the communication subnetwork to a first subnetwork differing from the communication subnetwork, where the first subnetwork is configured in accordance with the present description and the communication subnetwork uses a second protocol differing from the spanning tree protocol of the first subnetwork, and the communication subnetwork is furthermore embodied and configured such that it is handled or is able to be handled by the spanning tree protocol of the first subnetwork as a virtual network node.

Here, the network nodes, interfaces and also the spanning tree protocol and the second protocol can be designed in accordance with the present description.

There can also be provision for the communication subnetwork to be handled or be able to be handled by the spanning tree protocol of the first subnetwork as precisely one virtual network node.

This communication subnetwork also offers the advantage that a communication network, comprising the first subnetwork and the communication subnetwork is able to be controlled in a simpler and leaner manner because, for example, the communication in the communication subnetwork is not significantly disturbed by the spanning tree protocol.

In this case, the communication subnetwork can, for example, be embodied and configured in accordance with a second subnetwork within the context of the present description.

The communication subnetwork can furthermore be embodied and configured such that one of its network nodes comprise a spanning tree master node in accordance with the present description and a further network node as a spanning tree auxiliary node in accordance with the present description. Furthermore, the communication subnetwork can also be configured such that one of its network nodes comprises a spanning tree master node in accordance with the present description and all other network nodes of the communication subnetwork are configured as spanning tree auxiliary nodes in accordance with the present description.

A communication subnetwork configured in this way makes it possible to deal with the spanning tree protocol in an especially simple manner because significant process steps of the spanning tree protocol are handled by the spanning tree master node and other network nodes of the communication subnetwork need only take over relatively non-complex support functions of the spanning tree protocol. In this way, a number or most of the network nodes of the communication subnetwork respectively are relieved of the burden of activities in accordance with the spanning tree protocol. Thus, the properties of the communication subnetwork, such as fast reconfiguration time or real-time capability, are only relatively little or not at all adversely affected by the spanning tree protocol.

Furthermore, the communication subnetwork can also include a network node which is embodied as a spanning tree reserve master node in accordance with the present description. In this way the property of the communication subnetwork of appearing as a virtual network node for the spanning tree protocol of the first subnetwork can be retained for malfunctions of the spanning tree master node, which further increases the fault tolerance and failsafe characteristics of the communication subnetwork.

The first subnetwork can typically use an STP, RSTP and/or MSTP protocol as the spanning tree protocol and the communication subnetwork can also be configured such that it is handled by the spanning tree protocol of the first subnetwork as a central node for the first subnetwork. In such cases, the central node can be configured, for example, in accordance with the present description. In particular, the central node can be comprise a root bridge of the STP, RSTP and/or MSTP protocol, with the protocols being configured, for example, in accordance with the IEEE Standard cited in the present description and the central node/root bridge also being able to be embodied in accordance with the corresponding standard or with a comparable standard.

For the case in which the communication network includes a spanning tree master node as well as a spanning tree reserve master node, the communication subnetwork can furthermore be embodied such that, in the normal state, the spanning tree functionality of the spanning tree master node exercises functionality as the central node for the first subnetwork. In the error state, the spanning tree functionality of the spanning tree reserve network node takes over the execution of the functionality of the central node for the spanning tree protocol of the first subnetwork. In this case, the central node can once again be embodied as in the present description, such as a root bridge.

An especially advantageous embodiment emerges if the communication subnetwork is embodied as a ring structure. In this way, during an outage of, not only an internal functionality of the spanning tree master node, but also an interface of the spanning tree master node, or also a faulty or interrupted line between two nodes in the communication subnetwork or between the communication subnetwork and the first subnetwork, in many cases the spanning tree reserve master node can take over the function as a central node for the spanning tree protocol. The communication subnetwork thus almost forms a virtual central node for the spanning tree protocol of the first subnetwork with an internal redundancy in relation to the functionality as central node. In conjunction with an STP, RSTP and/or MSTP protocol as the spanning tree protocol, the second communication subnetwork could in the present cited embodiment typically be seen as a "redundant root bridge".

The taking over of the functionality as central node by the spanning tree reserve master node from the spanning tree master node can, for example, be undertaken such that the spanning tree reserve master node also takes over the identification data of the spanning tree master node within the spanning tree protocol. In this way, the taking over of the functionality as central node by the spanning tree reserve master node would not be perceptible in the spanning tree protocol of the first subnetwork, because for the spanning tree protocol the communication subnetwork configured in accordance with the present explanation would continue to appear as one and the same virtual central node. Furthermore, however, the spanning tree reserve master node can also retain its original characteristic data, e.g., within the spanning tree protocol even after taking over the functionality as central node for the spanning tree protocol.

The present object is likewise achieved by a communication network, comprising a first subnetwork in accordance with the present description, as well as a second subnetwork and/or a communication subnetwork in accordance with the present description. A communication network embodied in this way can be more simply controlled since the second subnetwork or the communication subnetwork respectively are seen as a virtual network node by the spanning tree protocol of the first subnetwork.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below by examples which refer to the enclosed figures, in which.

DETAILED DESCRIPTION OF THE PRESENTLY PREFERRED EMBODIMENTS

Figure 1:
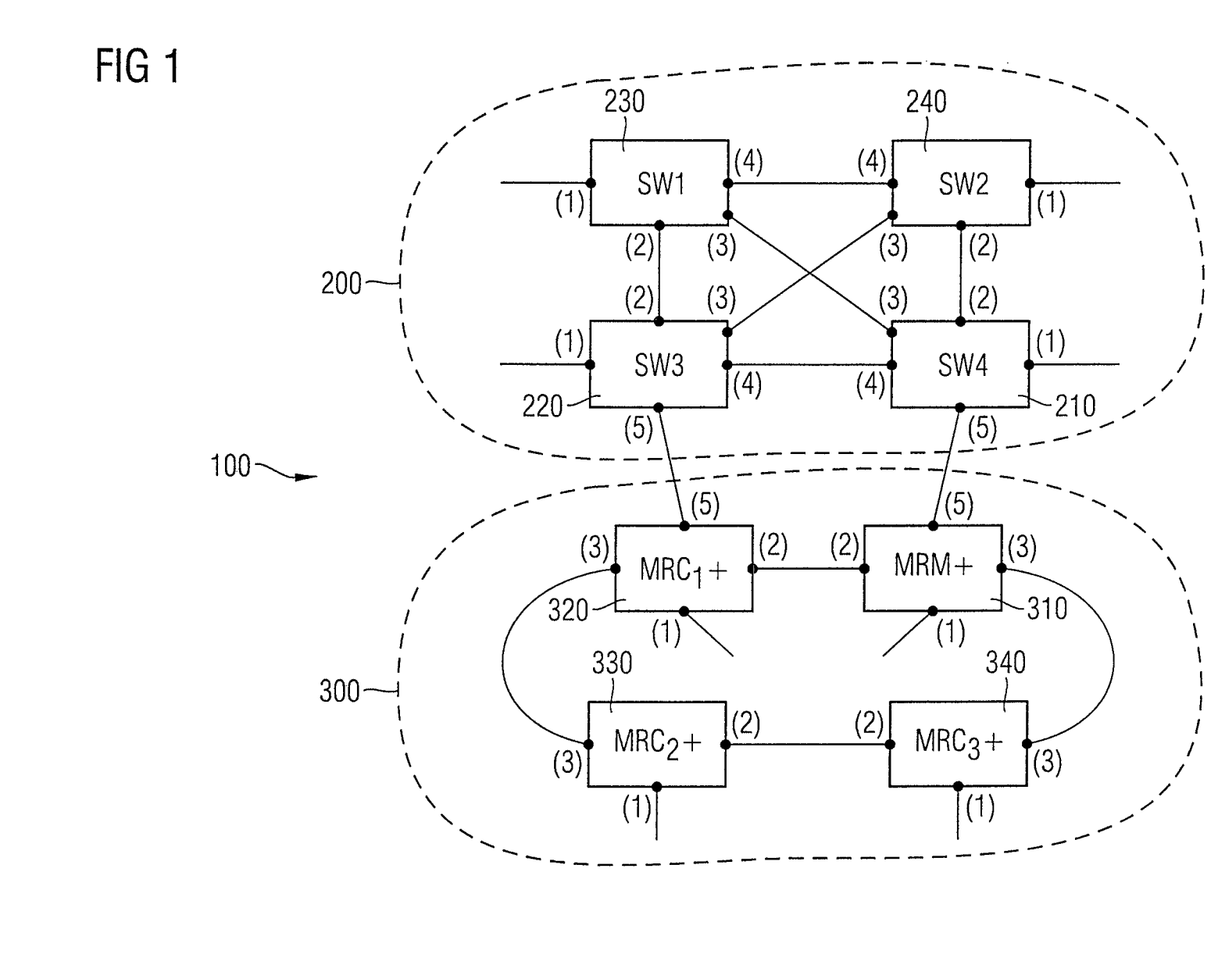
FIG. 1 is a schematic block diagram illustrating a communication network consisting of an office network and an industrial network.

FIG. 1 is a schematic block diagram depicting a communication network 100 which features a first subnetwork 200 comprising an office network and a second subnetwork 300 comprising an industrial network.

The office network 200 comprises four network nodes ("switches") 210, 220, 230, 240 which are labeled in FIG. 1 by SW1 to SW4. Each of these switches 210, 220, 230, 240 includes a number of interfaces ("ports"), which are sequentially numbered for each of the switches 210, 220, 230, 240. Consequently, each port of a switch 210, 220, 230, 240, is able to be uniquely assigned and defined by the specification of the switch and the number of the port. The four switches 210, 220, 230, 240 are linked by network lines between their ports and the office network 200, which is an example of a first subnetwork within the meaning of the present description. Each of the switches SW1 through SW4 has an external interface which is identified for each of the switches SW1 through SW4 by the number (1). By these external interfaces telecommunication terminals such as computers, telephones, automation modems or also further communication networks can typically be connected to a respective switch.

The ports of the switches SW3 220 and SW4 210 of the office network 200 identified by the sequence number (5) are also external interfaces of the office network 200 by which the connection to the industrial network 300 is accordingly established.

An STP or RSTP protocol is installed on the first subnetwork 200 with which, for example, transport loops or redundant communication paths can be avoided. Thus, for example, there are different transmission paths for a message sent from switch SW2 240 to switch SW3 220, from which, within the framework of the STP or RSTP protocol, only one will be selected and the others will be disabled by setting the states of the individual ports of the different switches. In the event of a change in the network, for example, through a line or port outage, the port states are then adapted in accordance with the STP or RSTP protocol such that once again the unique and especially loop-free communication paths are present within the network.

In FIG. 1, for example, the switch SW1 230 can take over the function of the root bridge for the STP or RSTP protocol respectively. Here, the information relating to the network structure, both of the first subnetwork 200 and also of an industrial network 300, provided the STP-RSTP protocol is also implemented there, is merged and this also takes over the corresponding control of the network.

The industrial network 300 likewise has four switches 310, 320, 330, 340 which are connected into a ring structure. In this case, the ring is formed by a connection of the ports identified by "2" and "3" respectively of switches 310, 320, 330, 340 of industrial network 300.

To improve the redundancy properties of the industrial network the "media redundancy protocol" (MRP) is installed in the industrial network through which, even in the event of failure of one of the ring lines, communication remains guaranteed within the industrial network 300. In this case, the management of this protocol is taken over by switch 310 of the industrial network 300, which is thus referred to in FIG. 1 as the "Media Redundancy Manager" (MRM). The other network nodes 320, 330, 340 of the industrial network 300 have a functionality to support this protocol and are thus labeled in FIG. 1 as "Media Redundancy Client" (MRC).

Furthermore, the switches 310, 320, 330, 340 of the industrial network 300 also feature external interfaces which are each labeled with the number (1). In addition, the ports of the switches 310 and 320 labeled with the number (5) are external interfaces of the industrial network 300, with the connection to the office network 200 being made through these interfaces.

Furthermore, the switches 310, 320, 330, 340 of the industrial network 300 are also integrated into the STP or RSTP protocol of the office network 200, respectively.

In this case, the MRM 310 in the industrial network 300 is configured so that through it the industrial network 300 of the STP or RSTP protocol of the office network 200 respectively is considered as a virtual network node. This additional functionality is symbolized by the "+" on MRM in FIG. 1. Through this coordinating functionality of the MRM+ the industrial network 300 appears within the framework of the RSTP or STP protocol as a virtual network node, with the external interfaces labeled with the sequence number (1) and (5) as external interfaces of the virtual network node. The internal structure of the industrial network plays no part or only a small part within the framework of the RSTP or STP protocol, because this knowledge and the corresponding information distribution and forwarding is taken over by the MRM+ 310 within the industrial network 300.

The MRC nodes 320, 330, 340 in the industrial network 300 support this coordinating function of the MRM+ 310 within the framework of the RSTP or STP protocol in that they can detect, understand and respond to the corresponding information, request or instruction messages from MRM+ 310. This property of the MRC nodes 320, 330, 340 is symbolized by an additional "+" in the label in FIG. 1.

Thus, for example, when the industrial network 300 is started up, the MRM+ 310 can send request messages to all MRC nodes 320, 330, 340, with the request to report the respective external interfaces and under some circumstances also internal interfaces back to the MRM+ 310. Then the MRM+ 310 can, for example, assign the individual external interfaces in the industrial network 300 unique port identification data so that each external interface in the industrial network 300 can be accessed uniquely by the STP or RSTP protocol, respectively. This port identification data is then sent again to the individual MRC nodes 320, 330, 340, so that each switch 310, 320, 330, 340 in the industrial network 300 is informed about the identification data of its ports. Furthermore, the complete information about which of the ports is located at which of the switches 310, 320, 330, 340 is present in the MRM+ 310.

This configuration has the advantage that the very fast reconfiguration time of the MRP protocol in the industrial network 300 is not adversely affected during faults in the industrial network 300 by the RSTP or STP protocol, because the inner structure of the industrial network 300 is not visible for the STP or RSTP protocol of the office network 200. A reconfiguration of the industrial network 300 by the MRM+ 310 influences the communication paths within the industrial network 300, but not its external interfaces and thus its appearance for the STP or RSTP protocol.

In accordance with the prior art, the STP or RSTP protocol would previously have to have been implemented in each of the network nodes 310, 320, 330, 340 of the industrial network to be able to couple the office network 200 to the industrial network 300. This would result, however, even for each line fault or similar errors in the industrial network 300, in the complete communication network 100, consisting of the office network 200 and the industrial network 300, having to be completely reconfigured by the STP or RSTP protocol which in some cases can last for a considerable time and during this period adversely affecting or even disabling the industrial network 300. Especially in the event of the industrial network 300 being used in automation or control, such downtimes are frequently not tolerable.

Figure 2:
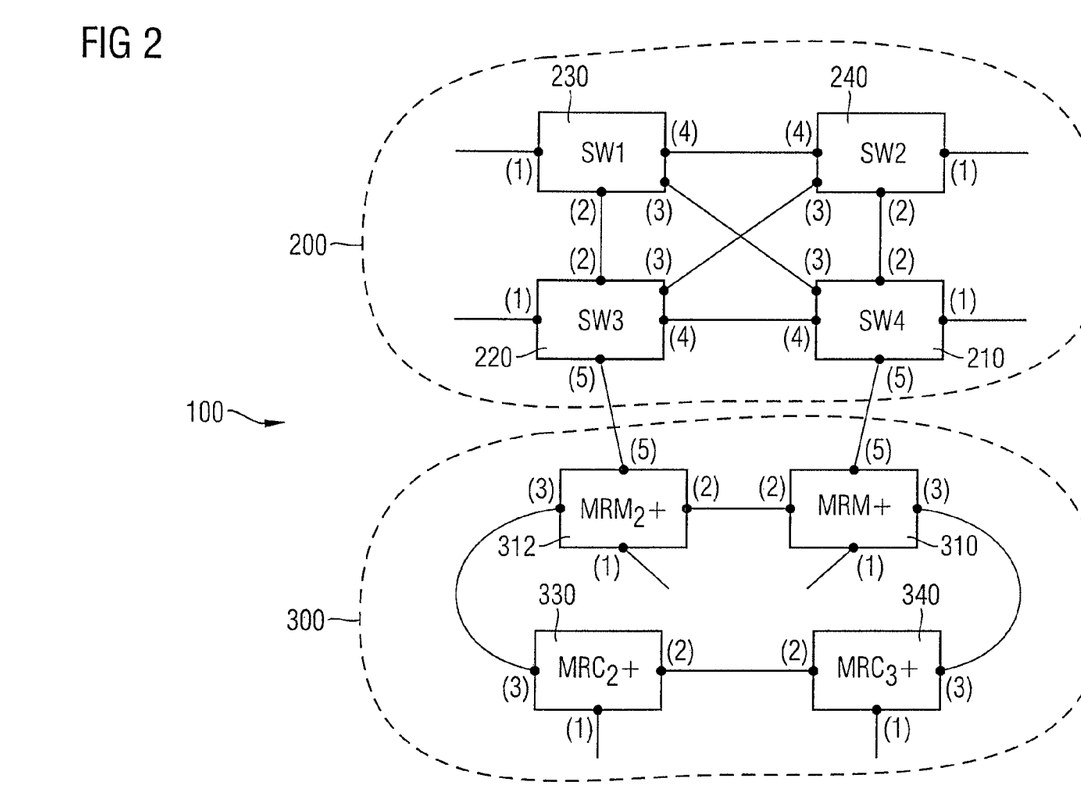
FIG. 2 is a schematic block diagram of an alternative embodiment of the communication network depicted in FIG. 1 with a reserve master node in the industrial network.

FIG. 2 shows the communication systems depicted in FIG. 1 in slightly modified form. In this figure MRC Client $MRC_1$+ 320 has been replaced by a "Reserve Master" $MRM_2$+ 312. All other network components of the communication network 100 correspond in their labels and configuration to those depicted in FIG. 1. In this case, the reserve master 312 of the industrial network 300 has the task of taking over the functionality of the MRM+ 310 if a malfunction occurs in this unit. Such a malfunction can typically be a complete outage of the MRM+ 310 or also an error in the program execution or in its interfaces. The $MRM_2$+ 312 is configured in this case such that it can take over both the role of the MRP master from the MRM+ 310, and also the role as the spanning tree master node for the industrial network 300 from the MRM+. Furthermore, it is also possible for the $MRM_2$+ 312 to only take over one of the two functionalities, i.e., in the case of the malfunction of the MRM+ 310 only affecting one of the two functionalities.

To prepare for such a takeover, the MRM+ 310 always transfers the information about the network configuration of the industrial network 300, the corresponding port states and/or the port identification data of the network nodes 310, 312, 330, 340 of the switches in the communication network 300, if anything changes or has changed in this information. In this way, the most up-to-date information is always present in the $MRM_2$+ 312 about the state of the industrial network 300, so that this can take over the aforementioned activity from the MRM+ 310 at any time.

The taking over of the aforementioned task from the MRM+ 310 by the $MRM_2$+ 312 can occur, for example, if the $MRM_2$+ 312 does not receive any messages over a predetermined period from the MRM+ 310 and can thus assume that it has failed. These tasks can also be taken over if the $MRM_2$+ 312 receives a corresponding message or information, for example, from the MRM+ 310 or also from another network node.

In the case of the MRM+ 310 being configured for the industrial network 300 to act through it as a virtual root bridge for the STP or the RSTP protocol of the office network 200 respectively, the $MRM_2$+ 312 can also take over this functionality from the MRM+ 310. In this case, this takeover can be configured such that the $MRM_2$+ 312 takes over the root bridge data of the MRM+ 310 directly, inclusive of the corresponding identification data. In this way, despite an outage or a fault of the MRM+ 310, the industrial network 300 appears as a virtual, unchanged root bridge for the STP or RSTP protocol of the office network 200.

Alternatively, the $MRM_2$+ 312 can use different identification data from that of the MRM+ 310, i.e., retain its previous identification data. On failure of the MRM+ 310 then provided with root bridge functionality, a replacement by the $MRM_2$+ 312 is then followed under some circumstances by further reconfiguration steps of the STP or RSTP protocol of the office network 200.

A further typical embodiment of the present invention is described below, with the embodiment relating to the coupling of a ring-type communication network on which a Media Redundancy Protocol (MRP) is implemented (referred to below as an MRP ring) to an Ethernet network on which the RSTP protocol is implemented (referred to below as an RSTP network). In this case, the RSTP network can typically correspond to the office network 200 in FIGS. 1 and 2, while the MRP ring can typically correspond to the industrial network 300 in FIGS. 1 and 2.

Furthermore, the information below relating to the MRP ring can extend to any ring and/or linear networks, while the subsequent remarks about the RSTP network can be expanded to STP and/or MSTP networks as well as to all communication networks with a spanning tree protocol in accordance with the present description.

The MRP ring is an example of a second subnetwork and/or a communication subnetwork in accordance with the present description, while the RSTP network is an example of a first subnetwork in accordance with the present description.

In accordance with the exemplary embodiment below, an efficient coupling of MRP rings to RSTP networks is achieved by the following mechanisms.

The MRP and RSTP decisions must be coordinated to compute the port states of the network nodes such that a valid MRP and RSTP network is formed, e.g., a linear topology for the MRP and a tree topology for the RSTP network. The procedure in this case is that the entire MRP ring appears as an individual virtual RSTP network node in an external view. Thus all MRP ring nodes which are linked to the RSTP network via external ports should send Bridge Protocol Data Units (BPDUs) with the same bridge identification. External ports in this case are non-ring ports in the example of a ring topology. In a linear topology ring ports which are not linked to other ring ports are handled as external ports. Furthermore, each of the external ports must be assigned a unique port ID in the MRP network, even if the external ports are located at physically different switches. A virtual bridge as described above, formed by the MRP ring can, for example, also act as a root bridge for the RSTP network.

In this case, there are different approaches for making the MRP ring behave as an individual virtual RSTP bridge. In a centralized strategy, one of the ring nodes can be responsible for sending BPDUs to all other RSTP-capable network nodes of the MRP ring and for receiving all BPDUs from these, with the central bridge also computing the port states of all external RSTP ports in the MRP ring and signaling them within the ring. This central bridge in the MRP ring is an example of a spanning tree master node within the meaning of the present description.

In a more distributed approach the port state computation is undertaken locally at all RSTP-capable nodes in the MRP ring, with the corresponding information being exchanged between these nodes so that each of the nodes has the same consistent view of the entire network.

The centralized approach will be discussed in detail below, with the overall concept not being restricted to this approach.

The central node in the MRP ring, which is responsible for the RSTP functionality of the MRP ring as a virtual bridge, is referred to below as the MRM+. All other ring nodes which are connected to external units by external ports only forward RSTP BPDUs which come from the MRM+ externally and vice versa. The other network nodes in the MRP ring are called MRC+, because these support the RSTP functionality of the MRM+. In this case, the MRM+ is an example of the MRM+ discussed in the context of FIGS. 1 and 2 as well as of a spanning tree master node within the meaning of the present description. The MRC+ can, for example, correspond to the MRC+ in FIGS. 1 and 2 and is also an example of a spanning tree auxiliary node in accordance with the present description.

The BPDUs are tunneled in the MRP protocol (e.g., by being encapsulated in the proprietary MRP frame). If the MRC+ are RSTP-capable, then this RSTP functionality must be switched off. The sole RSTP functionality which is executed in the MRC+ is deleting learned addresses in the "forwarding table" if this is necessary on account of port stage changes and is initiated by the MRM+.

This solution also allows pure MRC nodes which have no expansions for handling RSTP functionalities to be used within the ring. In any event, such nodes may not be linked by external ports to the RSTP network located externally. If this were to be the case conflicts would arise between the MRP protocol and the RSTP protocol. In any event, most of the pure MRC nodes which are used in the automation environment are two port nodes which are not adversely affected by such a disadvantage.

Each change in the MRP ring which is visible in the RSTP network results in a new computation of the spanning tree. Examples of this are changes to the identification data of network nodes or interfaces of network nodes through the connection of new nodes or ring segments within the existing MRP ring, or also outages in the ring, specifically also an outage of the MRM+. RSTP has significantly greater reconfiguration times than MRP (e.g., a few seconds for RSTP compared to a few tenths or hundreds of seconds for MRP) and the connections between the RSTP node part during the reconfiguration are lost in some cases. Consequently, the embodiments described here enable changes which are visible externally in the RSTP network to be avoided or minimized where possible. Thus, the MRP ring should be in a stable state before it undertakes the activity as a virtual RSTP network node.

With legacy RSTP BPDUs a relatively long time is required before these are recognized by the RSTP protocol and removed. Consequently, the MRC+ network nodes should keep their external ports in the blocking state during the starting of the MRP ring. The sending out of RSTP BPDUs in this phase would tend to lead to disruptive information within the RSTP network and unnecessarily complicate or prolong its start-up or reconfiguration.

Before the MRP ring assumes its functionality as virtual node, it must configure itself. To do this an individual network node within the ring is selected as the MRM+ and all other network nodes in the ring are set as MRC+ or also conventional MRC nodes. As described above, the MRM+ computes the "RSTP State Machine". For this purpose it requires information about the MRC+ network nodes which are installed in the MRP ring and about their properties such as their addresses, local port indices, local port priorities and the port path costs of the external ports. In addition to this local MRC+ port information, the MRM+ can also collect adjacency information relating to the ring ports of all MRC+ nodes in the ring. To do this the MRM+ sends a corresponding request to all MRC+ network nodes and these send a corresponding response message back. The MRM+ then computes unique port IDs consisting of a priority and an index for each port of each network node. In order to initialize the MRP ring as a virtual bridge, this information is sent by the MRM+ to each MRC+ with the external interfaces.

During operation the same telegrams are also used to record or effect corresponding changes to the port states. Furthermore, the MRM+ generates BPDUs which are tunneled to the ring network nodes, which then send these through the external RSTP ports and vice versa. The MRM+ detects changes in topology based on BPDU information and BPDU timeout monitoring, as is usual in RSTP. The MRC+ create and tunnel BPDUs to the MRM+ in the event of connection changes at their external interfaces.

For connection faults within the MRP ring, the MRM+ opens its blocked port, after which in the worst case the MRP ring is again fully functional after a few tenths or hundredths of a second, for example. The default setting of the RSTP "hello time" is two seconds and two repeats are allowed in this case. Consequently, such a change in the MRP ring does not cause any reconfiguration in the RSTP network. To be able to react in a sensible manner to a failure of the MRM+, a replacement MRM+ can already be defined in advance, for example. This can typically be used by the active MRM+, to which end this replacement MRM+ (also $MRM_2+$) receives all necessary information from the MRM+, such as bridge ID, port IDs and MRM priorities of all MRM+ ring nodes, for example. The active MRM+ informs the replacement MRM+ about its role as replacement MRM+ and always supplies it with the current RSTP information. In this way, it is possible at any time for the replacement MRM to assume the role as MRM+ without this having significant consequences for the RSTP network (except for the ports of the failed MRM+).

For a smooth transition from the old to the new MRM+, the new MRM+ can use the existing bridge ID of the virtual RSTP node instead of its own original bridge ID as RSTP network node. This MRM+ redundancy concept helps to remedy or at least to reduce one of the most disruptive disadvantages of RSTP: The comparatively long reconfiguration time after a failure of the root bridge. In the event of the virtual bridge formed by the MRP ring being selected as the root bridge, which can easily be achieved by assigning a correspondingly small bridge ID, a redundant root bridge can be obtained in this manner.

The replacement MRM+ or also $MRM_2+$ in accordance with the present example is an example of an $MRM_2+$ as has been described in conjunction with FIGS. 1 and 2 and is also an example of a spanning tree reserve master node in accordance with the present description.

The exemplary embodiment just described is extended below to the case in which an originally faulty MRM+ network node has transferred its functionality to the replacement MRM+ network node on occurrence of an error and is installed into the MRP ring again after a repair. A problem can occur here if the replacement MRM+ has taken over the bridge ID of the original MRM+. There would then be two network nodes with the same ID after the installation of the repaired MRM+.

A procedure in this case can be that the repaired MRM+ waits for a specific time after installation before it sends out its RSTP BPDUs. During this waiting period, it receives RSTP BPDUs from one or more adjacent nodes from which it can also recognize the current ID of the current root bridge. In this way, the repaired MRM+ recognizes that its ID is already present in the network and stops the automatic start-up process. A corresponding diagnosis and correction run can then occur to remedy this problem.

A further alternative for dealing with this problem is that there is provision for exchanging the IDs of MRM+ and the replacement MRM+ in the event of an error. For this purpose, both the MRM+ and also the replacement MRM+ always both know the IDs. On failure of the active MRM+, the replacement MRM+ then takes over the original ID of the MRM+. In addition, the MRM+ is configured so that for a new start, it recognizes based on this stored data that it must start up with the ID of the original replacement MRM+. In this way, the MRM+ and the replacement MRM+ have reversed their roles and no duplicated bridge IDs occur in the network.

In a further embodiment of the present invention, the first subnetwork in accordance with the present description can also have a linear structure and/or a ring structure. Furthermore, there can be provision in this case for the first subnetwork to be handled or to be able to be handled as a virtual network node by the spanning tree protocol of the second subnetwork. In this case, the first subnetwork can also have the features of a second subnetwork or communication subnetwork in accordance with the present description.

In accordance with this embodiment, for example, both the first and also the second subnetwork can have a ring structure, with each of the rings appearing for the respective other ring as a virtual network node. In this case, two adjacent subnetworks with a ring structure can act as two virtual network nodes and use fast local RSTP switchover. On failure of the root port of a virtual network node there can be a switchover to an alternate port of the virtual network node previously computed by the spanning tree protocol, on failure of a designated port, there can be a switchover to a corresponding backup port. This case is able to be used especially advantageously in a configuration in which adjacent ring networks are linked by at least two redundant connections. Here, the fault in one of the connections can be handled locally by the RSTP switchover process, which leads to a rapid healing or reconfiguration of the coupled network rings.

The present invention describes a communication network composed of a number of subnetworks with, in at least one of the networks, a spanning tree protocol for avoiding transport loops and redundant paths being implemented and with at least one of the subnetworks being handled or being able to be handled by the spanning tree protocol as a virtual network node. In this way, reconfigurations in accordance with the spanning tree protocol and within a subnetwork appearing as a virtual network can be decoupled or essentially decoupled and thus, for example, reconfigurations are accelerated and facilitated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

What is claimed is:

1. A network node for a communication network having a first subnetwork using a spanning tree protocol and a second subnetwork connected to the first subnetwork, the second subnetwork using a second protocol differing from the spanning tree protocol of the first subnetwork:
    the network node being configured as an element of the second subnetwork and configured for communication within the second subnetwork; and
    the second subnetwork having at least one external interface;
    wherein the network node is configured by a spanning tree functionality as a spanning tree master node to check and control the second subnetwork such that the second subnetwork is handled or is able to be handled by the spanning tree protocol of the first subnetwork as a virtual network node such that the second subnetwork is identifiable as a single node by the first subnetwork;
    wherein the spanning tree functionality of the spanning tree master node comprises:
    issuing interface identification data comprising Port ID information for external interfaces of the second subnetwork, said external interface comprising interfaces of network nodes which are unconnected between network nodes; and
    transferring the interface identification data comprising Port ID to other network nodes of the second subnetwork.

2. The network node as claimed in claim 1, wherein the spanning tree protocol (STP) comprises at least one of a STP protocol, a rapid spanning tree protocol (RSTP) and a multiple spanning tree protocol (MSTP), and the spanning tree functionality comprises at least one of STP functionality, an RSTP functionality and a MSTP functionality.

3. The network node as claimed in claim 1, wherein the second subnetwork has at least one of a linear structure and ring structure.

4. The network node as claimed in claim 2, wherein the second subnetwork has at least one of a linear structure and ring structure.

5. The network node as claimed in claim 1, wherein the second subnetwork uses a realtime-capable protocol, which further uses at least one of a HiPER Ring, hierarchically segmented routing (HSR), Turbo Ring, resilient Ethernet protocol (REP) and multiple registration protocol (MRP).

6. The network node as claimed in claim 1, wherein the spanning tree functionality of the spanning tree master node further includes at least one of:
    (i) detecting external interfaces of the second subnetwork,
    (ii) computing one of interface states and external interfaces of the second subnetwork,
    (iii) transmitting the interface states to other network nodes of the second subnetwork,
    (iv) at least one of receiving a protocol data message assigned to the spanning tree protocol from a further network node of the second subnetwork and
    (v) at least one of (a) determining a reaction to the received protocol data message and (b) transferring a response protocol data message as a reaction to the received protocol data message to the further network node of the second subnetwork; and
    wherein a functionality of the spanning tree master node as a central node for the first subnetwork is such that the second subnetwork is handled or is able to be handled by the spanning tree functionality of the spanning tree master node by the spanning tree protocol of the first subnetwork as the central node for the first subnetwork.

7. The network node as claimed in claim 1, wherein the network node as the spanning tree master node is configured to allocate to another network node a functionality of a spanning tree reserve master node.

8. The network node as claimed in claim 7, wherein the network node as the spanning tree master node one of transfers required information and is configured to transfer the required information to implement a spanning tree functionality of the spanning tree reserve master node.

9. The network node as claimed in claim 8, wherein the network node as the spanning tree master node at least one of (i) transfers received information in accordance with one of (a) a predetermined rule or (b) a predeterminable rule and (ii) is configured to transfer the received information in accordance with one of (a) the predetermined rule or (b) the predeterminable rule.

* * * * *